US008703266B2

(12) United States Patent
Crawford et al.

(10) Patent No.: US 8,703,266 B2
(45) Date of Patent: Apr. 22, 2014

(54) IMPREGNATED CLOTH

(71) Applicant: Concrete Canvas Technology Ltd., Pontypridd (GB)

(72) Inventors: William Campbell Crawford, South Glamorgan (GB); Peter Eric Brewin, Nantwich (GB)

(73) Assignee: Concrete Canvas Technology Ltd., Pontypridd (GB)

( * ) Notice: Subject to any disclaimer, the term of this patent is extended or adjusted under 35 U.S.C. 154(b) by 0 days.

(21) Appl. No.: 13/708,074

(22) Filed: Dec. 7, 2012

(65) Prior Publication Data
US 2013/0129946 A1 May 23, 2013

Related U.S. Application Data

(63) Continuation of application No. 13/146,836, filed as application No. PCT/GB2010/000156 on Jan. 29, 2010, now Pat. No. 8,343,609.

(30) Foreign Application Priority Data

Jan. 29, 2009 (EP) .................................... 09001199

(51) Int. Cl.
*B32B 5/26* (2006.01)
*B32B 13/14* (2006.01)
(52) U.S. Cl.
USPC ................... 428/70; 428/72; 428/86; 428/87; 428/305.5; 427/181
(58) Field of Classification Search
USPC ......... 428/86, 87, 304.4, 305.5, 306.6, 312.2, 428/312.4, 68, 70, 72, 156, 157; 427/181
See application file for complete search history.

(56) References Cited

U.S. PATENT DOCUMENTS

| 4,495,235 A | 1/1985 | Tesch |
| 5,041,330 A | 8/1991 | Heerten et al. |

(Continued)

FOREIGN PATENT DOCUMENTS

| DE | 9016062 U1 | 2/1991 |
| DE | 10260694 A1 | 6/2004 |

(Continued)

OTHER PUBLICATIONS

International Search Report and Written Opinion for PCT/GB2010/000156, Both Completed by the European Patent Office on Oct. 22, 2010, All together 13 Pages.

*Primary Examiner* — Cheryl Juska
(74) *Attorney, Agent, or Firm* — Andrus Intellectual Property Law, LLP

(57) ABSTRACT

A knitted spacer fabric has a tightly knitted bottom layer, a more loosely knitted upper layer and linking fibers extending across the space between the lower and upper faces. Settable material, e.g. cement, is introduced into the space between the upper and lower faces and can be caused to set by the addition of a liquid, e.g. water. Until set, the fabric is flexible and can be shaped but after the material in space has set, the fabric is rigid and can be used as a structural element in a wide range of situations. The bottom layer has an extension that extends beyond the upper face and is connected to the upper face by elastic connecting fibers that draw the extension towards the other face, thereby at least partly closing the space at the edge of the cloth and preventing the settable material from spilling out. In addition, the packing of the settable material and maximum space between the faces are such that only a predetermined amount of liquid can be accommodated within the space and that amount is matched to the water required to set the cement.

20 Claims, 3 Drawing Sheets

(56) References Cited

U.S. PATENT DOCUMENTS

| | | |
|---|---|---|
| 5,112,665 A | 5/1992 | Alexander |
| 5,346,566 A | 9/1994 | White |
| 5,589,245 A | 12/1996 | Roell |
| 6,156,406 A | 12/2000 | Rock et al. |
| 7,465,283 B2 | 12/2008 | Grim et al. |
| 7,552,604 B1 | 6/2009 | Waldrop et al. |
| 7,607,730 B2 | 10/2009 | Moseneder |
| 7,611,999 B2 | 11/2009 | McMurray |
| 7,721,749 B2 | 5/2010 | Brewin et al. |
| 7,849,715 B2 | 12/2010 | Starbuck et al. |
| 7,913,520 B1 | 3/2011 | Chen et al. |
| 8,287,982 B2 * | 10/2012 | Brewin et al. ............ 428/86 |
| 8,343,609 B2 * | 1/2013 | Crawford et al. ......... 428/70 |
| 2004/0097151 A1 | 5/2004 | McMurray |
| 2006/0155223 A1 | 7/2006 | Koch |
| 2007/0238392 A1 | 10/2007 | Starbuck et al. |
| 2008/0017229 A1 | 1/2008 | Brewin et al. |
| 2008/0287852 A1 | 11/2008 | Evans |
| 2010/0233417 A1 | 9/2010 | Brewin et al. |

FOREIGN PATENT DOCUMENTS

| | | |
|---|---|---|
| DE | 102006009923 A1 | 9/2007 |
| EP | 748889 A2 | 12/1996 |
| WO | 2005052235 A1 | 6/2005 |
| WO | 2005124063 A2 | 12/2005 |
| WO | 2007144559 A2 | 12/2007 |

* cited by examiner

IMPREGNATED CLOTH

CROSS-REFERENCE TO RELATED APPLICATIONS

The present application is a continuation of co-pending U.S. patent application Ser. No. 13/146,836, filed Sep. 6, 2011, which application is the U.S. national stage application of International Application No. PCT/GB2010/000156, filed Jan. 29, 2010, and which applications are incorporated herein by reference. The International application claims priority of European Patent Application No. 09001199.0, filed Jan. 29, 2009, which application is incorporated herein by reference.

TECHNICAL FIELD

The present invention relates to a cloth that has been impregnated with a material that, when mixed with a liquid, will set, or, in one embodiment, will set when exposed to radiation. Such cloth has numerous applications.

TECHNICAL BACKGROUND

WO 2005/124063 describes a shelter that includes a ground sheet and a cover; the space between the ground sheet and the cover can be inflated by pumping air into the space to raise the cover and form the shelter. The cover is made of a fabric that has been impregnated with cement; the fabric may be a type of felt known as "wadding", which is a loose non-woven fabric. Immediately before the interior space is inflated, the cover is wetted with water, so that, after inflation, the cement in the cover sets and forms a rigid shell that acts as a self-supporting roof for the shelter, which is particularly useful in providing temporary accommodation in emergency areas.

WO2007/144559 discloses a fabric comprising a pair of opposed faces and self-supporting yarns (also called linking fibres) extending between the faces that maintain the faces in a spaced-apart arrangement and a solid powder material located in the space between the faces. The powder material is capable of setting to a rigid or semi-rigid solid mass on the addition of a liquid or on exposure to UV radiation and may comprise cement that will set to solid cement or concrete on the addition of a water-based liquid. The amount of settable material in the space in the fabric is such that, particularly when the material has set, it occupies substantially the whole of the space between the first and second faces. The fabric (without the powder material) may be spacer fabric, which is known and commercially available. The thickness of the spacer fabric is determined during manufacture by choosing an appropriate length for the linking fibres.

U.S. Pat. No. 4,495,235 discloses a flat body containing a core made of cement and aggregates placed between a cover layer and a backing layer. The layers and the cores are needle bonded together prior to the hardening of the cement so that the layers will hold together in a deformable state.

The term "cloth" or "filled cloth" will be used in the present specification to denote a spacer fabric having an internal space containing settable powder material. A "spacer fabric" is a fabric having a first face and a second face separated from each other by a space and also has self-supporting linking fibres extending between the first and second faces that maintain the first and second face in a spaced-apart arrangement. The settable powder material will also be referred to as the "fill"; the fill may include both material that reacts with the liquid to cause the fill to set, which will be referred to as the "reagent", and materials that do not react with the liquid, e.g. auxiliaries and inert materials such as fillers.

One problem with powder filled cloth is that the fill spills out of the open edges of the spacer fabric, causing a mess during the manufacture, transport and use of the cloth, and the loss of the fill in the edge region of the fabric makes the properties of the edge region different from those of the rest of the cloth, and often the edge region must be removed when the cloth is used. Additionally some powdered fillers, particularly those having a melting temperature that is substantially different from the fibres of the spacer fabric, for example cement and most fillers, make heat cutting and sealing difficult or impossible for two reasons: firstly, they remain as powders and clog the melted plastic preventing it acting as a sealing material and secondly they increase the heat input required for effective heat cutting and clog the cutting blade preventing it from melting the spacer fabric fibres neatly. Therefore in order for heat sealing to work the cloth must be cut mechanically and the powder must be first removed from the edge being sealed; a preferred method is to suck the powder out in the area adjacent to the edge using a vacuum, then apply heat and pressure to seal the faces. However the multiple steps in the process make it time consuming and laborious or require expensive and bulky machinery, also the process is often unreliable and slow due to the requirement to have a dust free surface for effective heat sealing.

A further problem with filled cloth is that it is difficult to control the amount of liquid that is added during the setting procedure. If the amount of liquid added is less than that required to completely set all the reactive material in the fill, some of the reactive reagent will be wasted and could have been replaced by cheaper inert filler. Ultimately, a region may remain in the middle of the cloth that contains unset material, resulting in a significant reduction in the properties of the cloth. Although a problem initially, if the setting liquid is water and the cloth comes into contact with water in use, e.g. because it is exposed to rain, then the reagent may become fully set in use. More generally, particularly where the amount of liquid added is only slightly less than the optimum the unset material will be distributed throughout the set material resulting in only slightly lower than optimum mechanical properties.

On the other hand, if too much liquid is added, the consequences can be much more severe, for example the fill may be converted into a slurry and washed out of the cloth. Also, the excess liquid will not react and instead will remain within the fill while the reagent sets; the liquid may drain out of the cloth after setting, leaving voids in the set fill, thereby reducing the density of the set material. This can result in a high level of porosity in the final set product, which can result in a significantly lower final strength and also a lower resistance to liquid ingress, which is undesirable for applications where the cloth acts as a barrier to liquids. Furthermore a high level of porosity can result in other undesirable properties, for example: an increase in susceptibility to freeze/thaw damage and chemical attack.

The adding of the correct amount of liquid is time-consuming and requires the use of trained personnel.

The present invention provides improvements in filled cloth and especially provides a solution to the above problems.

DISCLOSURE OF THE INVENTION

According to a first aspect of the present invention, there is provided a flexible cloth that can be set to become rigid or semi-rigid, the cloth comprising:

a first face;
a second face separated from the first face by a space;
self-supporting linking fibres extending between the first and second faces that maintain the first and second face in a spaced-apart arrangement; and
a powder material located in the space between the first and second faces, which material is capable of setting to a rigid or semi-rigid solid on the addition of a liquid or on exposure to radiation,
wherein, at one or more edges of the cloth, the first and second faces are connected by an elastic yarn that at least partly closes the space at the edge.

The elastic yarn (which will be referred to as the "edge yarn") will normally be shorter than the self-supporting linking fibres, thereby at least partly closing off the space at the edge of the fibre but, when stretched, can have the same (or greater) length as the rest of the connecting fibres in the spacer fabric but when allowed to contract under its own tension, it achieves the desired shorter length. The elastic yarn may stretch by more than 100% of its length without breaking. This allows the same machine to be used to form the edges of the spacer fabric as is used for forming the rest of the spacer fabric; at the edge(s) of the spacer fabric, the elastic yarn can be used in place of some or all (and preferably all) of the normal linking fibre yarns with the elastic edge yarns being woven or knitted in a stretched condition. After the fabric has been removed from the machine used to make it, e.g. a knitting machine, the elasticity in the edge yarns causes the faces of the fabric to be drawn towards each other at the edge of the cloth, thereby at least partly closing the space within the fabric at its edges.

The part or full closure of the edges of the space in the cloth means that, when the powder material is filled into the space, it is constrained to remain within the cloth and can less easily spill out of the sides.

This aspect of the present invention can be implemented by providing an extension at the edge of one or both faces that extends laterally beyond the rest of the face and that is connected to the rest of the fabric by the elastic yarns; the elastic yarn at the edge of the cloth then draws the extended portion towards the other face, thereby at least partly closing the space at the edge.

The extended edge may also be longer than the distance between the two faces such that when the extended portion is drawn up the edge extends vertically above the face for a short distance.

The powder material may be settable on the addition of water and in one embodiment may comprise cement, optionally Portland cement or high alumina cement (the latter having the advantage that it provides shorter setting times and a more rapid gain in early strength than other cements) or a combination of these cement with each other or with other cements. The fill may include fillers, e.g. sand or fine aggregates, fly ash, glass beads, low density or recycled fillers, chopped natural or synthetic fibres, lime flour, mica insulators, surface modified silica, pigments, anti fungal-agents and anti-radiation fillers. The cement may be combined with additives customarily found in cement or concrete compositions. Thus a number of reaction modifiers may be included for example lithium compounds, sodium compounds, organic compounds (citric acid, tartaric acid), sulphate sources, plasticisers, accelerants, retarders, super plasticisers, shrinkage reducing agents, water repellent agents and dispersible polymer powders). The liquid used to set the cement is water which may be sea water or water that has been modified by the addition of other chemicals which may include any of the above additives that are water soluble.

Alternatively, the settable material may be one component of a multi-part curable resin that cures when two or more liquid components are mixed together, e.g. an epoxy resin system. In accordance with the first aspect of the present invention, the powder may be a UV settable material.

The second aspect of the present invention relates to a way of controlling the amount of liquid added to the cloth.

At least one of the first and second faces is porous to the setting liquid, and the other face may be porous or non porous to the setting liquid or indeed impermeable to any liquid or gas. The linking fibres limit the gap between the two faces and hence limit the maximum internal volume. The liquid is added to the cloth and passes through one (or possibly both, if provided) porous faces before soaking into the fill and reacting with the reagent to cause the cloth to set into a rigid sheet.

The density of the powdered fill material trapped between the first and second faces in the cloth is related not only to the material density of the grains of the reagent and ancillary materials in the fill, but also to the packing of the fill, particularly the amount of space that is occupied by air due to the imperfect tessellation of the particles (void fraction). It is possible by careful adjustment of the manufacturing conditions and also selection of the reagents and other ancillary materials, especially the nature of the filler material, the specific particle size distributions, densities and ranges of shapes of the particles, to control the packing density of the particles and hence the void fraction within the fill that is loaded into the material. Once the fill has been loaded and sealed into the material it cannot leave, hence the void fraction can be fixed at the point of manufacture.

On addition of the liquid, air is displaced from the void fraction, some of the reagent is dissolved in the liquid and additionally the liquid causes the reagent to swell. If unrestrained, this expansion will continue until the reagent is entirely suspended or dissolved in the liquid. In accordance with the second aspect of the present invention, the volume of the space between the two faces of the cloth is limited by the linking fibres constraining how far the faces can be moved apart (in the context of the setting of the fill and the forces applied to them in such a process, the linking fibres are of a fixed length). The faces may be of a sufficiently closed construction that neither will permit the passage of the reagent or filler even when saturated in the liquid. Hence the fabric can constrain the swelling of the reagent and so the increase in the volume of the fill can be controlled.

Therefore, in this arrangement, it is possible to limit the quantity of the liquid that can be added to the fill for a given area of cloth. This is primarily achieved by adjusting the void fraction within the fill and setting the properties of the linking fibres, e.g. their length, stiffness and the quantity of the linking fibres within the fabric so that the space available to accommodate the liquid, including an allowance for a small amount of expansion that results due to the pressure exerted by the swelling of the fill during addition of the liquid (the allowance for a given fill is governed by the stiffness and quantity of the linking fibres), equals the amount of liquid that is required to be added.

By control of the following variables in manufacturing, it is possible to produce a filled cloth where the void ratio and swelling is controlled so as to limit the space available to be occupied by the liquid component:
the arrangement, shape and physical properties of the linking fibres,
the selection of the filler materials with suitable physical characteristics including density and particle size and shape distributions, the selection of the reagents with suitable physical characteristics including density and particle size and shape distributions, careful control of the manufacturing process especially loading the fill to the correct bulk density within the material and control of the ratio of reagents and fillers within the dry fill.

If for example the space available is controlled to be close to the optimum amount of liquid required to be added to set all the reagent, then no matter how much liquid is present around the cloth it is impossible to add too much liquid to the interior of the cloth. This has significant advantages including:

1. The material can be immersed and (as in the preferred embodiment where the liquid is water) will set underwater without significantly altering the properties of the set material.
2. The risk of errors from user mistakes is reduced significantly.
3. The level of training and skill necessary to correctly use the cloth is reduced.
4. If additional liquid contacts the cloth, for example if it is set in the rain, it will not alter the properties of the set material.

According to this second aspect of the present invention, there is provided a flexible cloth that can be set to become rigid or semi-rigid, the cloth comprising:

a first face;
a second face separated from the first face by a space;
self-supporting linking fibres extending between the first and second faces that maintain the first and second face in a spaced-apart arrangement; and
a compacted powder material located in the space between the first and second faces, which material is capable of setting to a rigid or semi-rigid solid on the addition of a liquid, wherein both the first and the second faces are substantially impervious to the powder material but at least one of them is pervious to liquid and wherein the amount and type of reagent in the compacted powder material, and the volume and compaction of the powder material are such that:

$$MV - OV = x \cdot LV$$

where:
MV=the maximum volume of the space within the cloth (per unit area of the cloth); thus MV includes both the volume of empty space in the cloth before addition of the powder material, and an additional volume resulting from any expansion of the space due to the pressure exerted by the swelling of the powder material during the addition of the liquid or during the setting of material. The additional volume may be modified by adjusting the quantity and stiffness of the linking fibres but will generally be of the order of up to 15%, e.g. about 12%, of the volume of empty space in the cloth before addition of the powder material;
OV=the volume of the space within the cloth that is occupied by the particles of the powder material, which volume does not include the volume occupied by voids within the powder material (per unit area of the cloth);
LV=the volume of liquid (per unit area of the cloth) that results in the maximum long term (28 day) compressive strength, of the fill blend when set; this can be derived empirically or from the reagent manufacturer/blenders recommended liquid to reagent/blend ratio; and
x=a factor between 0.65 and 1.1

The factor x may be less than 1, e.g. 0.85-0.99, such as 0.87-0.91. For example using a particular HAC based Cement formulation, where the liquid is water, the value of x used is 0.89.

In other words, the cloth is such that (and especially compaction of the settable material and the amount of reactant in the settable material and the maximum volume between the faces are such that) only a predetermined amount of liquid can be accommodated within the space and that amount is matched to the liquid required to set the reagent. Thus it is not possible in normal use to add too much liquid to the interior of the cloth.

Generally, due to inevitable variations in manufacturing conditions and materials, there may be slight variations in the optimum amount of liquid to be added, i.e. the minimum amount of liquid required to set the reagent fully; it is generally preferable to err on the side of adding too little liquid than too much, i.e. the factor x is preferably less than 1. In some cases however it is desirable to deliberately use above or below the theoretical optimum amount of liquid. For example for certain applications it may be desirable to have a high level of porosity and hence a ratio of liquid to reagent that is higher than the optimum. In other instances a low ratio may be desirable for example unreacted reagent can impart limited self-healing properties to a material as cracks can allow liquid to penetrate the set material and react with the unreacted reagent held within the set material.

In order to achieve the desired ratio it is typically necessary to obtain a relatively high density of dry fill within the cloth, i.e. the fill is compacted within the fabric. In addition to controlling the liquid to reagent ratio, a high density of dry fill also has the following advantages:

1. The dry fill is less prone to movement within the material when subjected to external forces for example: vibration during transport.
2. The wetted fill is less prone to movement due to liquid movement when the liquid is added, for example if the liquid is added by spraying or jetting onto one of/or the porous face(s).
3. When the material is manipulated, or folded, the dry, or wetted but unset fill is less likely to move, which may result in weakened area or line in the set material.
4. In some cases a denser level of reagent will evolve more heat per unit area which can advantageously accelerate the reaction and also enable the reaction to occur at low temperatures.

It should be noted that the dry fill must not be so compacted as to either reduce the void fraction to a value below that where there is insufficient space within the cloth to allow the desired amount of liquid to be accommodated or that the fill particles are so closely packed that they restrict the passage of liquid through the fill to such an extent that an insufficient quantity of the liquid is able to contact the reagent element within the fill and hence an insufficient fraction of the reagent is able to react. In practice this undesirably high level of compaction is difficult to achieve in most cases.

Although WO 2007/144559 teaches that the amount of settable material in the space in the fabric is such that, particularly when the material has set, it occupies substantially the whole of the space between the first and second faces, it does not teach that the mix and density (i.e. degree of compaction) of the settable material should be selected that it complies with the above formula and so can be used to control the water to cement ratio and so optimise the physical properties of the cloth when set by avoiding the possibility of adding too much liquid. This allows the cloth to be set in the presence of excess liquid, e.g. underwater, while still providing the desired physical properties. In the case of a cement filled cloth, which is the form of cloth that is specifically exemplified in WO 2007/144559, the present invention generally requires a careful selection of the filling materials and a greater degree of compaction than was apparent from WO 2007/144559 in order to comply with the above formula.

The settable powder material and/or the liquid can include additives e.g. flexiblizers, foaming agents, fillers, reinforcement materials etc. that are known in the art in connection with the settable materials concerned, as described above.

The settable material is preferably added to the space through pores formed in the first face of the fabric, in which case, the first face will have pores that are large enough to allow the material to be placed in the fabric. However, after the material has been placed in the fabric, it is desirable to make the first face substantially impervious to the fill material and WO2007/144559 describes several techniques that can be applied to achieve this.

Firstly, a further layer may be bonded onto the first face after the settable material has been introduced into the fabric. One such layer could by way of example be a damp-proof layer, which could find application in the construction industry or tunnelling.

Secondly, the first face may be made of, or include, an elastomeric yarn so that the upper face can be stretched to enlarge pores within the face to allow the settable material to be introduced into the fabric but, once the material has been added to the fabric, the stretching forces can be released, to close the pores to a size such that the settable material cannot readily escape through the first face.

Thirdly, the first face can be treated after the settable material has been introduced into the fabric to close the pores of the first face. For example, it is possible to treat the first face by applying a sealing material such as an adhesive or to subject the first face to solvent treatment to fully or partially close the pores. In one example, a PVC paste may be applied (for example using a scraper) to the first face and cured for example by heat, e.g. by means of radiative heaters or hot air blowers.

Fourthly, the first face can be knitted from fibres that will shrink when heated, thereby enabling the settable materials to be introduced through a knit having pores sufficiently open to allow the particles to pass through; after the settable material has been introduced into the fabric, the first face are heated, e.g. using heated air, causing the fibres to contract to close the pores so as to substantially prevent the particles of settable materials from escaping.

A combination of the above procedures may also be used.

The second face is preferably substantially impervious to the settable material so that the fill does not fall through the second face when added through the first face. However, in order to assist in the penetration of liquid into the space, the second face is preferably porous to the liquid applied to set the fill. Thus, the second face preferably includes pores having a size allowing the liquid to penetrate but not allowing material particles to pass through. If nevertheless the second face has pores that are too large to retain the material within the space, it is possible to prevent the material falling out through the second face using any of the measures discussed above.

As already mentioned, the second and in some cases the first face of the fabric may be such that the liquid can penetrate into the space through the faces to contact the settable powder material within the space. Such liquid penetration can take place either by including pores within the face (as discussed above) and/or by making the yarns of the first and second faces from a material that can be wetted by the liquid concerned and therefore the liquid will be wicked through the first and second faces to come into contact with the settable material within the fabric. Furthermore, capillary action between fibres within the first and second faces can assist in providing liquid to the settable material. Suitable materials for use in forming the first and second faces include:

polypropylene, which is the preferred material to use when the settable material includes cement, as it has excellent chemical resistance to alkaline conditions;

coated glass fibres, which can provide reinforcement to the set material;

polyethylene;

PVC fibres, which have the advantage of being relatively easy to bond using chemical or thermal bonding.

A mixture of fibres can be used.

The linking fibres in the fabric are self-supporting and should be sufficiently stiff, i.e. they should be sufficiently resistant to bending under forces tending to crush the fabric, to maintain the spacing between the faces when the settable material has been loaded onto the first face to feed the material into the fabric. The density of the linking fibres, i.e. the number of yarns per unit area, is also an important factor in resisting crushing forces while the material particles are being added and so maintaining the spacing between the faces and in restricting the movement of the material particles once they are trapped between the upper and lower layers. The linking fibres are generally made of the same material as the faces, as listed above. Generally the linking fibres are a monofilament as this provides the greatest stiffness.

It is important, in accordance with the present invention, that the linking fibres do not divide the space within the fabric into individual small closed compartments since such a division would allow cracks to propagate within the fabric and so reduce the strength of the fabric once the material has set.

The particle size of the settable material must be sufficient to allow it to be introduced into the fabric but it should not be so fine as to fall out of pores in the first and/or second faces. Especially preferred are high alumina cements since among other attributes they provide shorter setting times and a more rapid gain in early strength than other cements.

The first and second faces and the linking fibres are preferably part of a spacer fabric, which can be formed with pores in the first and second faces by the knitting process used to make it. The second face is preferably more tightly knitted than the first face so that the pores in the second face are smaller than in the first face to allow the settable powder material to be introduced into the space through the relatively large pores in the first face and prevent the material falling out of the fabric through the second face.

The cloth of the present invention can be manufactured and caused to set at will any time later by the addition of the liquid, e.g. water. The fabric can therefore be made at one location, transported to another location, where it is caused to set by the addition of the liquid, which can be supplied locally, thereby reducing the bulk that must be transported. The fabric impregnated with the solid powder will still be flexible and can be folded or rolled up for transport.

The fabric of the present application has many applications. Firstly, it can be used to form the cover of a prefabricated shelter as described in WO 2005/124063. However, it has wider applications and, for example, can be used:

to form a track-way for vehicles, pedestrians or animals;

to form a shelter by applying the fabric to a framework;

to make formwork for casting concrete;

to form barriers, e.g. to line tunnels;

to repair or reinforce structures, e.g. roofs;

to form floors or damp proof structures;

to reinforce earth structures, e.g. river banks and unstable slopes;

to provide flood defences;

to repair existing pipes, including buried water pipes or to construct new pipes;

to fireproof elements of new or existing structures e.g. as a fireproof covering or lining for chimneys;

to form a hard surface, reduce dust hazards and contain fuel spills for aircraft e.g. helicopter landing sites and runways;

to reinforce sandbag structures and protect them from damage from the elements such as wind and ultra violet degradation;

to line ground works and prevent the leaching of chemical contaminants eg. for land fill or secondary fuel containment works;

to form a waterproof lining for the containment of water e.g. pond, canal lining and water storage or settling or septic tanks;

to form permanent awnings or roof structures;

to line drainage ditches;

to provide an external weatherproof facing for buildings;

to form an integral part of a durable gabion structures;

to repair and/or reinforce gabion structures and protect them from damage from the elements such as wind and ultra violet degradation;;

to form artistic or decorative forms, or to form hulls and superstructure of floating vessels such as boats or pontoons.

If the settable material is set by the addition of water, the water can be added deliberately or the fabric can be put in a place where it will come into contact with water, e.g. in a watercourse or outside where it can absorb rain. For example, it is possible to bury the fabric in damp earth and allow it to absorb water from the earth, thereby causing the settable material to set.

Once the cloth has set, the fibres also provide reinforcement to the set fill material and substantially increase its strength and, if the fill material becomes cracked, it allows the cloth to fail progressively (rather than catastrophically) by taking up load on the cloth.

There is theoretically no limit to the thickness of the cloth, although it will generally be limited by the manufacturing techniques used to produce it. A typical thickness would be between 2 and 70 mm, e.g. from 2 to 40 mm, and typically between 4 and 30 mm, e.g. from 4 to 20 mm. One important consideration limiting the thickness of the material is the ability of the liquid to penetrate through the interior of the settable material before the outer portions of the settable material has set. A further limitation on the thickness comes from the increased weight of the fabric with increased thickness and if it is too thick, the faces may not be able to support the weight of the settable material within the fabric.

BRIEF DESCRIPTION OF DRAWINGS

There will now be described, by way of example only, a fabric material in accordance with the present invention, by reference to the accompanying drawings in which.

DETAILED DESCRIPTION

Figure 1:
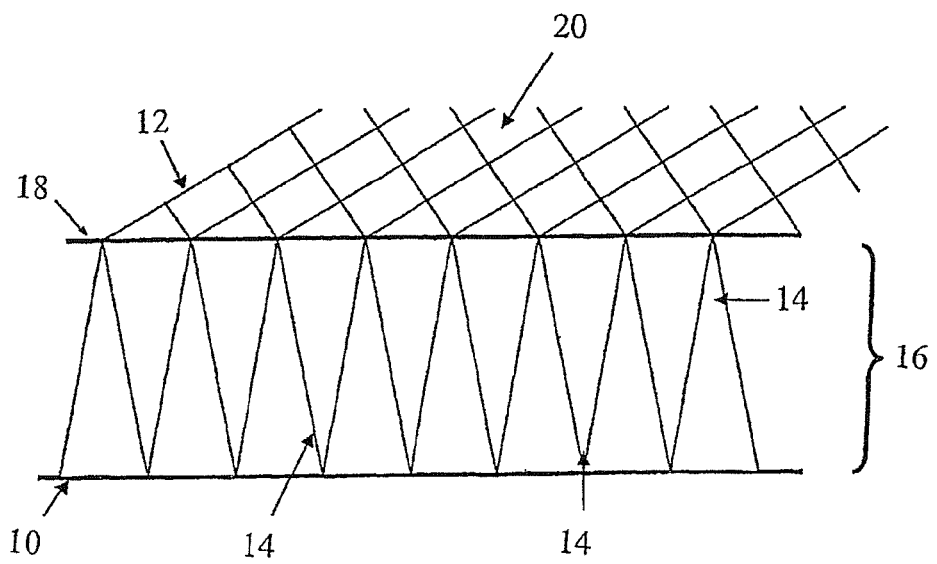
FIG. 1 is a diagrammatic illustration of a spacer fabric.

Referring to the accompanying drawings, FIG. 1 shows a schematic knitted spacer fabric having a tightly knitted bottom face layer 10, a more loosely knitted upper face layer 12 and linking fibres 14 extending across the space 16 between the lower and upper face layers 10, 12. The spacer fabric is made of knitted polyethylene and is commercially available from Scott & Fyfe as 5 mm spacer fabric.

Settable material, e.g. cement optionally together with fillers and other additives, is introduced into the fabric through pores 20 in the open-knit upper face layer 12. The pores 20 arise through the knitting process during manufacture of the spacer fabric. The cement can be placed on the spacer fabric and will fall through pores 20 into space 16. The penetration through the pores 20 can be assisted by placing the spacer fabric on a vibrating bed and by brushing the fill into the pores, e.g. using a rotating brush. Vibration also has the advantage of settling the cement within the space 16 to minimise voids or air pockets that are formed.

The bottom face 10 has a relatively tight knitted structure and the pores in the bottom face are smaller than in the upper face layer such that the pores are sufficiently small to prevent substantial amounts of the cement from falling out.

After the material has been introduced into the space 16, the upper face layer 12 is sealed by the application of a thin coat of PVC paste which is then cured by heating the surface.

Water can penetrate into the fabric through the pores in the bottom face 10; hydration of the cement is aided by the linking fibres 14, which can wick water into the interior of the fabric.

The cloth including the fabric and the settable fill material within the space 16 is flexible and can be formed to shape prior to the introduction of liquid to set the material within the space.

The long fibres 18, together with the shorter fibres in the fabric, provide reinforcement to the material, when set and prevent crack propagation.

Figure 2:
FIG. 2 is a cross sectional view through the fabric.
Figure 3:
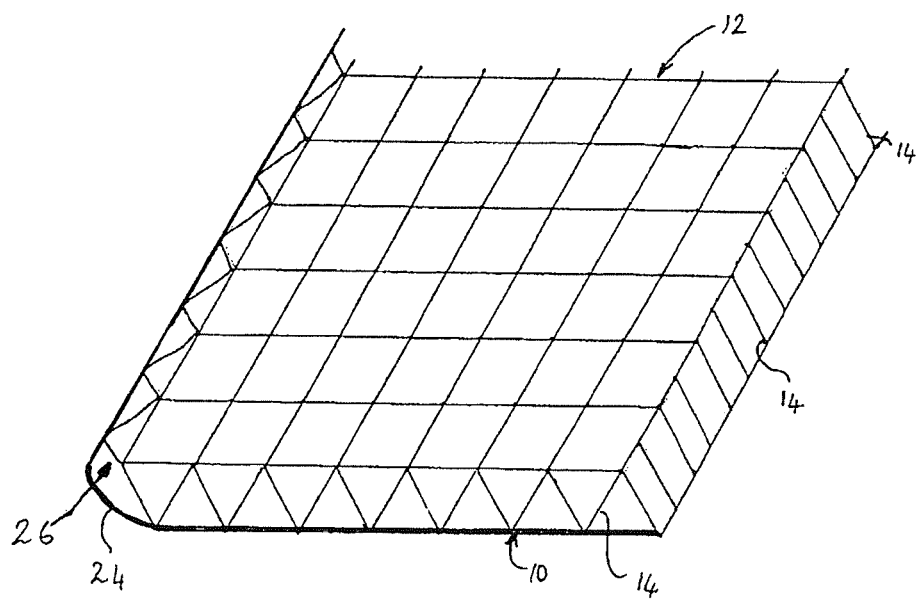
FIG. 3 is a diagrammatic illustration of spacer fabric according to one embodiment of the present invention.

FIG. 3 shows a spacer fabric that can be used for making the cloth of the present invention; except as set out below, it is identical to the fabric of FIGS. 1 and 2, and the same reference numbers as are used in connection with FIGS. 1 and 2 have been used in FIG. 3 to shown the same features. However, in the fabric of FIG. 3, the edge of the lower face layer 10 is extended beyond the edge of the upper face layer 12 by an extension 24 formed in exactly the same way as the rest of the lower face layer 10 except that linking fibres 26 connecting the extension to the upper face 12 is made of an elastic material which is stretched during knitting. When the tension is no longer applied to the elastic linking fibres 26, e.g. by removing the fabric from the knitting machine, the extension 24 is drawn up around the edge of the fabric by the linking fibres 26 and so closes off the edge of the fabric. When a settable fill is added through the pores 20 in the upper layer 12, it cannot spill out of the sides of the fabric.

Figure 4:
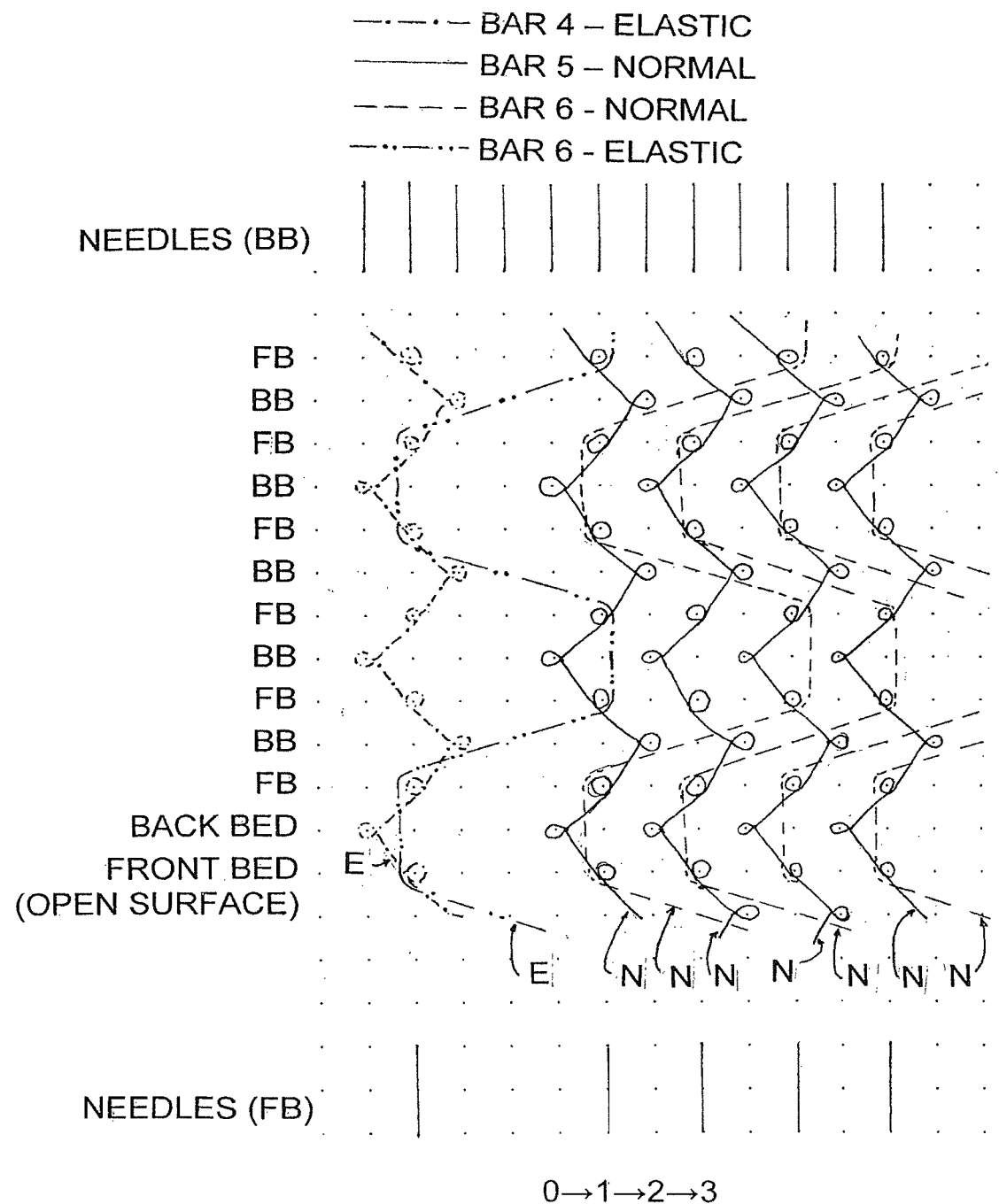
FIG. 4 is a needle diagram for knitting the spacer fabric of FIG. 3.

FIG. 4 shows the pattern of needles used for knitting the edge of the spacer fabric shown in FIG. 3 where the normal yarns used to form the bulk of the spacer fabric, e.g. polypropylene, are shown by the letter "N" while the elastic used to form the linking fibres 26 are shown by the letter "E".

EXAMPLE 1

A high alumina cement is loaded into the fabric shown in FIG. 3 using the vibration and brushing techniques described above to form a filled cloth. Water is used to set the cement. The theoretical optimum water:cement ratio in this case is 0.4 by weight. The cloth has a porous face 10 of sufficiently closed construction to prevent the dry cement powder and also the cement powder once soaked in water from passing through it in significant quantities, the other face 12 has an impermeable PVC coated face to close off the pores 20. The two faces are linked by monofilament polyethylene linking fibres. The high alumina cement is compacted to give a total dry density of 1.35 g/cm$^3$ and an average thickness of 7.3 mm between the outer surfaces of the two faces.

The linking fibres are spaced, slightly bowed and of sufficient stiffness such that after immersion in water the swelling of the cement powder between the two faces is constrained to a 14% internal volume increase. When this increased volume is entirely filled with water as a result of immersion this represents a 10% increase in the weight of the material. In addition to the increase in volume, the water also displaces air from the void fraction and dissolves a proportion of the cement which results in a further 22% increase in weight.

Continued immersion does not result in any further increase in weight. Therefore, the cloth construction limits the water to cement ratio to 0.32 being slightly below the 0.4 optimum to provide the maximum 28 day compressive strength. In other words, the factor x in the above formula is 0.32/0.4=0.8.

The invention claimed is:

1. A flexible cloth that can be set to become rigid or semi-rigid, the cloth comprising:
    a first face;
    a second face separated from the first face by a space;
    self-supporting linking fibres extending between the first and second faces that maintain the first and second face in a spaced-apart arrangement; and
    a compacted powder material located in the space between the first and second faces, which material is capable of setting to a rigid or semi-rigid solid on the addition of a liquid, wherein both the first and the second material is substantially impervious to the powder material but at least one of them is pervious to liquid and wherein the amount and type of reagent in the compacted powder material, and the volume and compaction of the powder material are such that:

$$MV-OV=x \cdot LV$$

where:
    MV=the maximum volume of the space within the cloth (per unit area of the cloth); thus MV includes both the volume of empty space in the cloth before addition of the powder material, and an additional volume resulting from any expansion of the space due to the pressure exerted by the swelling of the powder material during the addition of the liquid or during the setting of material;
    OV=the volume of the space within the cloth that is occupied by the particles of the powder material, which volume does not include the volume occupied by voids within the powder material (per unit area of the cloth);
    LV=the volume of liquid (per unit area of the cloth) that results in the maximum long term (28 day) compressive strength, of the fill blend when set; and
    x=a factor between 0.65 and 1.1.

2. The cloth of claim 1 wherein the cloth further comprises connecting fibres that connect said first and second faces, said connecting fibres being an elastic yarn that is shorter than the self-supporting linking fibres, thereby at least partly closing the space at the edge of the cloth.

3. The cloth of claim 2, wherein, at said one or more edges, at least the first or second face includes an edge portion that extends laterally beyond the rest of the face and that is connected to the rest of the fabric by the elastic yarns, said elastic yarn drawing the extending portion towards the other face, thereby at least partly closing the space at the edge of the cloth.

4. The cloth of claim 1, wherein the cloth is a component in a structure selected from the group consisting of: a shelter, a track-way for vehicles, pedestrians or animals, formwork, a barrier, a tunnel liner, a floor or damp proof structure, a reinforced earth structure, flood defences, a repaired or new existing pipe, a fireproof element of a new or existing structure, a helicopter landing site, an aircraft runway, a reinforced sandbag structure, a groundworks lining, a waterproof lining, a permanent awning, a roof structure, a lined drainage ditch, a weatherproof facing for a building, a gabion structure, an artistic or decorative form, and a hull or a superstructure of a floating vessel.

5. The cloth of claim 1, wherein the settable powder material comprises cement.

6. The cloth of claim 5, wherein the settable powder material comprises a cement-based dry concrete mix including plasticisers and other additives.

7. The cloth of claim 1, wherein the first face has pores that are large enough to admit the powder material into the space, which pores are at least partly sealed or have been reduced in size, thereby retaining the settable powder material within the space.

8. The cloth of claim 7, wherein the pores are at least partly sealed by a sealant, an adhesive, a heat curable material or a layer of material applied to the first face.

9. The cloth of claim 1, wherein the first face is backed by a further layer comprising a damp proof layer being impervious to liquids or gases.

10. The cloth of claim 1, wherein x is a number that is less than 1.

11. The cloth of claim 1, wherein x is a number in the range of 0.85-0.99.

12. The cloth of claim 1, wherein x is a number in the range of 0.87-0.91.

13. A structure comprising a flexible cloth that can be set to become rigid or semi-rigid, the cloth comprising:
    a first face;
    a second face separated from the first face by a space;
    self-supporting linking fibres extending between the first and second faces that maintain the first and second face in a spaced-apart arrangement; and
    a compacted powder material located in the space between the first and second faces, which material is capable of setting to a rigid or semi-rigid solid on the addition of a liquid, wherein both the first and the second material is substantially impervious to the powder material but at least one of them is pervious to liquid and wherein the amount and type of reagent in the compacted powder material, and the volume and compaction of the powder material are such that:

$$MV-OV=x \cdot LV$$

where:
    MV=the maximum volume of the space within the cloth (per unit area of the cloth); thus MV includes both the volume of empty space in the cloth before addition of the powder material, and an additional volume resulting from any expansion of the space due to the pressure exerted by the swelling of the powder material during the addition of the liquid or during the setting of material;
    OV=the volume of the space within the cloth that is occupied by the particles of the powder material, which volume does not include the volume occupied by voids within the powder material (per unit area of the cloth);

LV=the volume of liquid (per unit area of the cloth) that results in the maximum long term (28 day) compressive strength, of the fill blend when set; and x=a factor between 0.65 and 1.1.

14. The structure of claim 13, wherein the structure is selected from the group consisting of a shelter, a track-way for vehicles, pedestrians or animals, formwork, a barrier, a tunnel liner, a floor or a damp proof structure, a reinforced earth structure, flood defences, a repaired or a new pipe, a fireproof element of a new or existing structure, a helicopter landing site, an aircraft runway, a reinforced sandbag structure, a ground works lining, a waterproof lining, a permanent awning, a roof structure, a lined drainage ditch, a weatherproof facing for a building, a gabion structure, an artistic or decorative form, and a hull or superstructure of a floating vessel.

15. The structure of claim 13, wherein the first face has pores that are large enough to admit the powder material into the space, which pores are at least partly sealed or have been reduced in size, thereby retaining the settable powder material within the space.

16. A method of making an impregnated flexible cloth that can be set to become rigid or semi-rigid, the method comprising:

providing a cloth having a first face, a second face separated from the first face by a space and self-supporting linking fibres extending between the first and second faces that maintain the first and second face in a spaced-apart arrangement, and loading the space within the cloth with a powder material that is capable of setting to a rigid or semi-rigid solid on the addition of a liquid, wherein both the first and the second material is substantially impervious to the powder material but at least one of them is pervious to liquid and wherein the amount and type of reagent in the compacted powder material, and the volume and compaction of the powder material are such that: $MV-OV=x$, $LV$ where: MV=the maximum volume of the space within the cloth (per unit area of the cloth); thus MV includes both the volume of empty space in the cloth before addition of the powder material, and an additional volume resulting from any expansion of the space due to the pressure exerted by the swelling of the powder material during the addition of the liquid or during the setting of material; OV=the volume of the space within the cloth that is occupied by the particles of the powder material, which volume does not include the volume occupied by voids within the powder material (per unit area of the cloth); LV=the volume of liquid (per unit area of the cloth) that results in the maximum long term (28 day) compressive strength, of the fill blend when set; and x=a factor between 0.65 and 1.1.

17. The method of claim 16, further comprising forming the flexible cloth into a structure selected from the group consisting of a shelter, a track-way for vehicles, pedestrians or animals, formwork, a barrier, a tunnel liner, a floor or damp proof structure, a reinforced earth structure, flood defences, a repaired or new pipe, a fireproof element of a new or existing structure, a helicopter landing site, an aircraft runway, a reinforced sandbag structure, ground works lining, a waterproof lining, a permanent awning, a roof structure, a lined drainage ditch, a weatherproof facing for a building, a gabion, an artistic or decorative form, and a hull or superstructure of a floating vessel, after the step of loading the space within the cloth with a powder material.

18. The method of claim 16, which comprises loading the powdered material into the space through pores in the first face and reducing the size of the pores or closing the pores once the powdered material has been loaded.

19. The method of claim 16, which comprises introducing a liquid through at least one of the first and second face of the cloth to cause the settable powder material to set.

20. The method of claim 16, wherein the space within the cloth is loaded with a powder material by a first step comprising placing the settable material on the first face of the cloth and a second step selected from the group consisting of vibrating the fabric and brushing powder material into the cloth.

* * * * *